(12) United States Patent
Rofougaran (10) Patent No.: US 7,689,174 B2
(45) Date of Patent: Mar. 30, 2010

(54) VOICE DATA RF GPS INTEGRATED CIRCUIT

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 488 days.

(21) Appl. No.: 11/713,286

(22) Filed: Mar. 2, 2007

(65) Prior Publication Data

US 2008/0146144 A1 Jun. 19, 2008

Related U.S. Application Data

(63) Continuation-in-part of application No. 11/641,999, filed on Dec. 19, 2006.

(51) Int. Cl.
*H04B 1/06* (2006.01)
(52) U.S. Cl. .................................. 455/73; 455/552.1
(58) Field of Classification Search ............... 455/3.02, 455/73, 75, 76, 550.1, 552.1, 553.1, 575.1
See application file for complete search history.

(56) References Cited

U.S. PATENT DOCUMENTS

2005/0096004 A1* 5/2005 Tso et al. ........................ 455/76
2008/0146144 A1* 6/2008 Rofougaran ............... 455/3.02

FOREIGN PATENT DOCUMENTS

| EP | 1335544 A2 | 8/2003 |
|---|---|---|
| EP | 1727291 A2 | 11/2006 |
| KR | 20060066021 | 6/2006 |

OTHER PUBLICATIONS

GSM "LoCosto", Texas Instruments, Technology for Innovators, pp. 1-2, Oct. 4, 2006.
Edge/GPRS/GSM Single-Chip Multimedia Baseband Processor, BCM2133, Product Brief, Broadcom Corporation, 2133-PB07-D1, Nov. 30, 2006, pp. 1-2.
WCDMA Baseband Coprocessor, BCM2141, Product Brief, Broadcom Corporation, 2141-PB03-R, Dec. 1, 2006, pp. 1-2.
Hedge Single-Chip Multimedia Baseband Processor, BCM2152, Product Brief, Broadcom Corporation, 2152-PB04-R, Dec. 1, 2006, pp. 1-2.
Andrew Fogg: DigRF Baseband/RF Digital Interface Specification; Logical, Electrical and Timing Characteristics, EGPRS Version, Digital Interface Working Group, version 1.12, pp. 1-32, Feb. 20, 2004.
Molecular Expressions Optical Microscopy Primer: Digital Imaging in Optical Microscopy, pp. 1-13, Sep. 13, 2006.

* cited by examiner

*Primary Examiner*—Thanh C Le
(74) *Attorney, Agent, or Firm*—Garlick Harrison & Markison; Timothy W. Markison (57) ABSTRACT

An integrated circuit (IC) includes a baseband processing module, a GPS receiver, an RF section, and an interface module. The GPS receiver module is coupled to recover a plurality of coarse/acquisition (C/A) signals and a plurality of navigation messages from a plurality of down converted GPS signals. The RF section is coupled to convert an inbound RF voice signal into the inbound voice symbol stream; convert the outbound voice symbol stream into an outbound RF voice signal; convert an inbound RF data signal into the inbound data symbol stream; convert the outbound data symbol stream into an outbound RF data signal; and convert a plurality of GPS RF signals into the plurality of down converted GPS signals.

20 Claims, 8 Drawing Sheets

VOICE DATA RF GPS INTEGRATED CIRCUIT

This patent application is claiming priority under 35 USC §120 as a continuation-in-part patent application of co-pending patent application entitled VOICE/DATA/RF INTEGRATED CIRCUIT, having a filing date of Dec. 19, 2006, and a Ser. No. 11/641,999.

CROSS REFERENCE TO RELATED PATENTS

NOT APPLICABLE

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to wireless communication systems and more particularly to integrated circuits of transceivers operating within such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As yet another example, if the data modulation scheme is x-QAM (16, 64, 128, 256 quadrature amplitude modulation), the data modulation stage functions to convert digital words into Cartesian coordinate symbols (e.g., having an in-phase signal component and a quadrature signal component). The IF stage includes mixers that mix the in-phase signal component with an in-phase local oscillation and mix the quadrature signal component with a quadrature local oscillation to produce two mixed signals. The mixed signals are summed together and filtered to produce an RF signal that is subsequently amplified by a power amplifier.

As is also known, hand held global positioning system (GPS) receivers are becoming popular. In general, GPS receivers include receiver-processors, and a highly-stable clock, and an antenna that is tuned to the frequencies transmitted by the satellites. The receiver may also include a display for providing location and speed information to the user. Many GPS receivers can relay position data to a PC or other device using a US-based National Marine Electronics Association (NMEA) protocol.

As the desire for wireless communication devices to support multiple standards continues, recent trends include the desire to integrate more functions on to a single chip. However, such desires have gone unrealized when it comes to implementing baseband and RF on the same chip for multiple wireless communication standards and GPS receiver functionality.

Therefore, a need exists for an integrated circuit (IC) that implements baseband and RF of multiple wireless communication standards on the same IC die with GPS receiver functionality.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
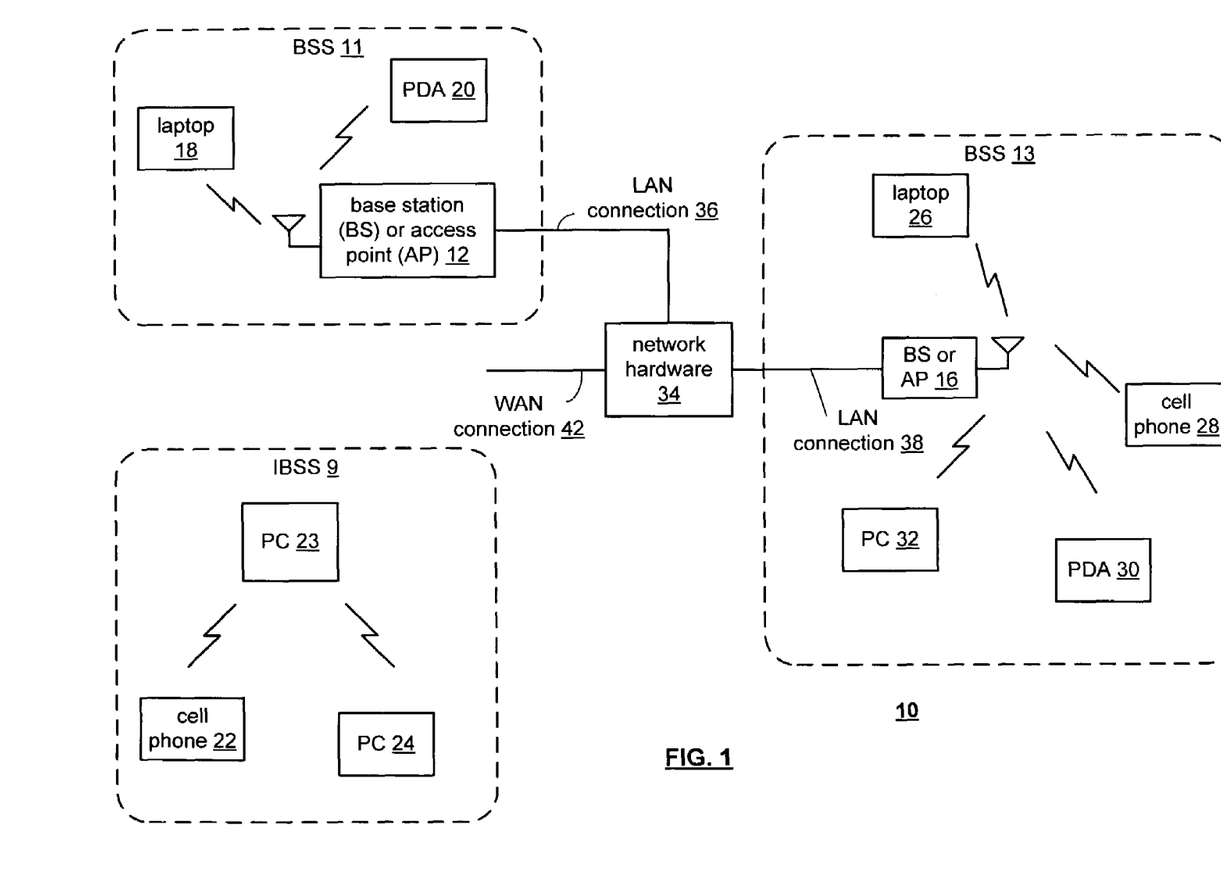
FIG. 1 is a schematic block diagram of an embodiment of a wireless communication system in accordance with the present invention.

FIG. 1 is a schematic block diagram of a wireless communication environment that includes a communication device 10 communicating with one or more of a wireline non-real-time device 12, a wireline real-time device 14, a wireline non-real-time and/or real-time device 16, a base station 18, a wireless non-real-time device 20, a wireless real-time device 22, and a wireless non-real-time and/or real-time device 24. The communication device 10, which may be a personal computer, laptop computer, personal entertainment device, cellular telephone, personal digital assistant, a game console, a game controller, and/or any other type of device that communicates real-time and/or non-real-time signals, may be coupled to one or more of the wireline non-real-time device 12, the wireline real-time device 14, and the wireline non-real-time and/or real-time device 16 via a wireless connection 28. The wireless connection 28 may be an Ethernet connection, a universal serial bus (USB) connection, a parallel connection (e.g., RS232), a serial connection, a fire-wire connection, a digital subscriber loop (DSL) connection, and/or any other type of connection for conveying data.

The communication device 10 communicates RF non-real-time data 25 and/or RF real-time data 26 with one or more of the base station 18, the wireless non-real-time device 20, the wireless real-time device 22, and the wireless non-real-time and/or real-time device 24 via one or more channels in a frequency band ($fb_A$) that is designated for wireless communications. For example, the frequency band may be 900 MHz, 1800 MHz, 1900 MHz, 2100 MHz, 2.4 GHz, 5 GHz, any ISM (industrial, scientific, and medical) frequency bands, and/or any other unlicensed frequency band in the United States and/or other countries. As a particular example, wideband code division multiple access (WCDMA) utilizes an uplink frequency band of 1920-1980 MHz and a downlink frequency band of 2110-2170 MHz. As another particular example, EDGE, GSM and GPRS utilize an uplink transmission frequency band of 890-915 MHz and a downlink transmission band of 935-960 MHz. As yet another particular example, IEEE 802.11 (g) utilizes a frequency band of 2.4 GHz frequency band.

The wireless real-time device 22 and the wireline real-time device 14 communicate real-time data that, if interrupted, would result in a noticeable adverse affect. For example, real-time data may include, but is not limited to, voice data, audio data, and/or streaming video data. Note that each of the real-time devices 14 and 22 may be a personal computer, laptop computer, personal digital assistant, a cellular telephone, a cable set-top box, a satellite set-top box, a game console, a wireless local area network (WLAN) transceiver, a Bluetooth transceiver, a frequency modulation (FM) tuner, a broadcast television tuner, a digital camcorder, and/or any other device that has a wireline and/or wireless interface for conveying real-time data with another device.

The wireless non-real-time device 20 and the wireline non-real-time device 12 communicate non-real-time data that, if interrupted, would not generally result in a noticeable adverse affect. For example, non-real-time data may include, but is not limited to, text messages, still video images, graphics, control data, emails, and/or web browsing. Note that each of the non-real-time devices 14 and 22 may be a personal computer, laptop computer, personal digital assistant, a cellular telephone, a cable set-top box, a satellite set-top box, a game console, a global positioning satellite (GPS) receiver, a wireless local area network (WLAN) transceiver, a Bluetooth transceiver, a frequency modulation (FM) tuner, a broadcast television tuner, a digital camcorder, and/or any other device that has a wireline and/or wireless interface for conveying real-time data with another device.

Depending on the real-time and non-real-time devices coupled to the communication unit 10, the communication unit 10 may participate in cellular voice communications, cellular data communications, video capture, video playback, audio capture, audio playback, image capture, image playback, voice over internet protocol (i.e., voice over IP), sending and/or receiving emails, web browsing, playing video games locally, playing video games via the internet, word processing generation and/or editing, spreadsheet generation and/or editing, database generation and/or editing, one-tomany communications, viewing broadcast television, receiving broadcast radio, cable broadcasts, and/or satellite broadcasts.

Figure 2:
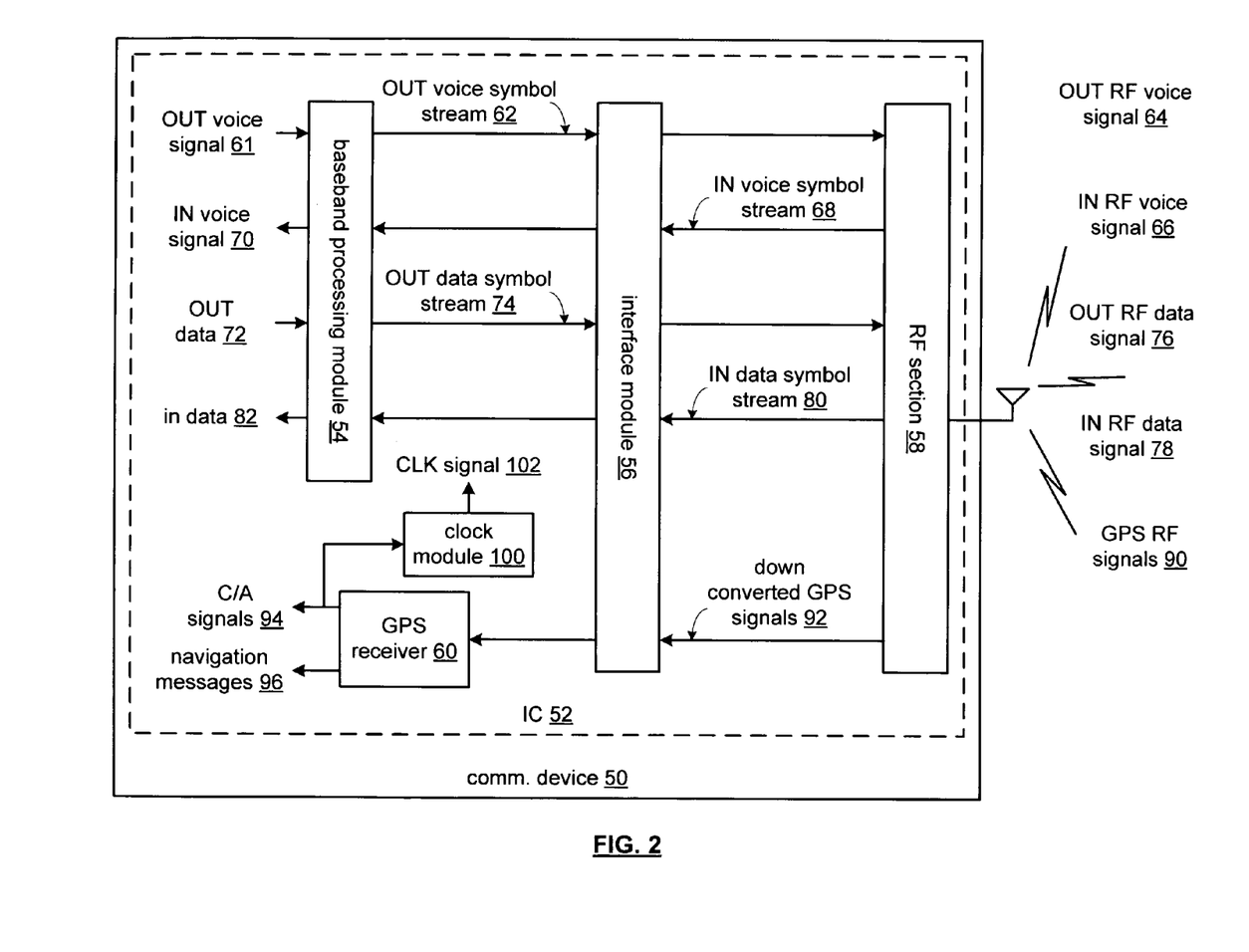
FIG. 2 is a schematic block diagram of an embodiment of a wireless communication device in accordance with the present invention.

FIG. 2 is a schematic block diagram of an embodiment of a wireless communication device 50 that includes an integrated circuit (IC) 52 and an antenna structure. The IC 52 includes a baseband processing module 54, an interface module 56, a radio frequency (RF) section 58, a global positioning system (GPS) receiver 60, and a clock module 100. Note that the communication device 50 may be one of the communication devices 18-32 of FIG. 1 or another type of wireless communication device.

The baseband processing module 54 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 54 may have an associated memory and/or memory element, which may be a single memory device, a plurality of memory devices, and/or embedded circuitry of the processing module 54. Such a memory device may be a read-only memory, random access memory, volatile memory, non-volatile memory, static memory, dynamic memory, flash memory, cache memory, and/or any device that stores digital information. Note that when the processing module 54 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module 54 executes, hard coded and/or operational instructions corresponding to at least some of the steps and/or functions illustrated in FIGS. 2-9.

The baseband processing module 54 is coupled to convert an outbound voice signal 61 into an outbound voice symbol stream 62 and to convert an inbound voice symbol stream 68 into an inbound voice signal 70 in accordance with one or more cellular voice communication standards (e.g., GSM, CDMA, WCDMA, AMPS, etc.). The baseband processing module 54 is also coupled to convert outbound data 72 into an outbound data symbol stream 74 and to convert an inbound data symbol stream 80 into inbound data 82 in accordance with one or more cellular data communication standards (e.g., EDGE, GPRS, etc.).

The RF section 58 (embodiment of which will be described in greater detail with reference to FIGS. 5-8) is coupled to convert an inbound RF voice signal 66 into the inbound voice symbol stream 68, convert the outbound voice symbol stream 62 into an outbound RF voice signal 64, convert an inbound RF data signal 78 into the inbound data symbol stream 80, convert the outbound data symbol stream 74 into an outbound RF data signal 76, and convert GPS RF signals 90 into a plurality of down converted GPS signals 92. Note that the GPS RF signals 90 may be one or more of: an L1 band at 1575.42 MHz, which includes a mix of navigation messages, coarse-acquisition (C/A) codes, and/or encryption precision P(Y) codes; an L2 band at 1227.60 MHz, which includes P(Y) codes and may also include an L2C code; and/or an L5 band at 1176.45 MHz. Further note that the GPS RF signals 90 include an RF signal from a plurality of satellites (e.g., up to 20 different GPS satellites RF signals may be received).

The interface module 56, which may be implemented as described in co-pending patent application entitled VOICE/DATA/RF INTEGRATED CIRCUIT, having a filing date of Dec. 19, 2006, and a Ser. No. 11/641,999, is coupled to convey the inbound voice symbol stream 68 and the outbound voice symbol stream 62 between the baseband processing module 54 and the RF section 58; convey the inbound data symbol stream 80 and the outbound data symbol stream 74 between the baseband processing module 54 and the RF section 58; and convey the down converted GPS signals 92 from the RF section 58 to the GPS receiver 60.

The GPS receiver 60 is coupled to recover a plurality of coarse/acquisition (C/A) signals 94 and a plurality of navigation messages 96 from a plurality of down converted GPS signals 92. The GPS receiver 60 utilizes the C/A signals 94 and the navigations messages 96 to determine the position of the communication device 50. This will be described in greater detail with reference to FIGS. 3 and 4.

The clock module 100, which may include a crystal oscillator and/or a phase locked loop, generates one or more clock signals 102 from one or more of the C/A signals 94. The clock signal(s) 102 may also be used by the GPS receiver 60 to determine the communication device's position.

Figure 3:
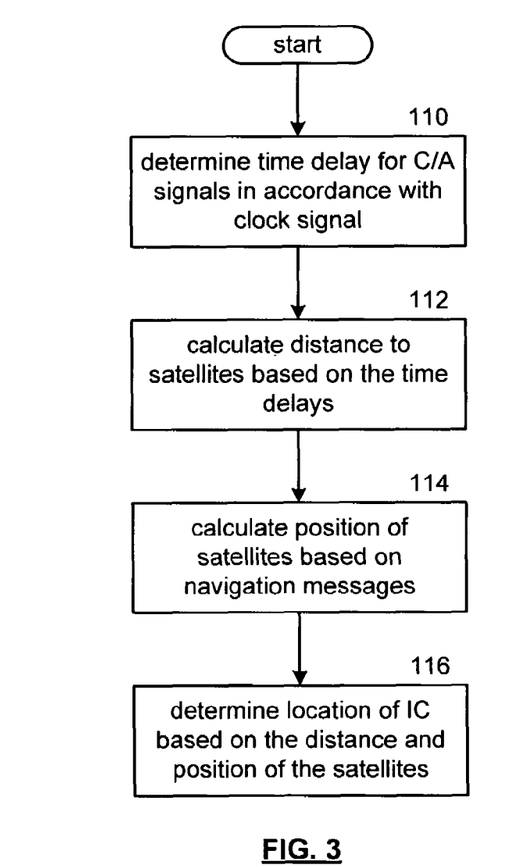
FIGS. 3 and 4 are logic diagrams of embodiments of a method for GPS functionality in an IC in accordance with the present invention.
Figure 4:
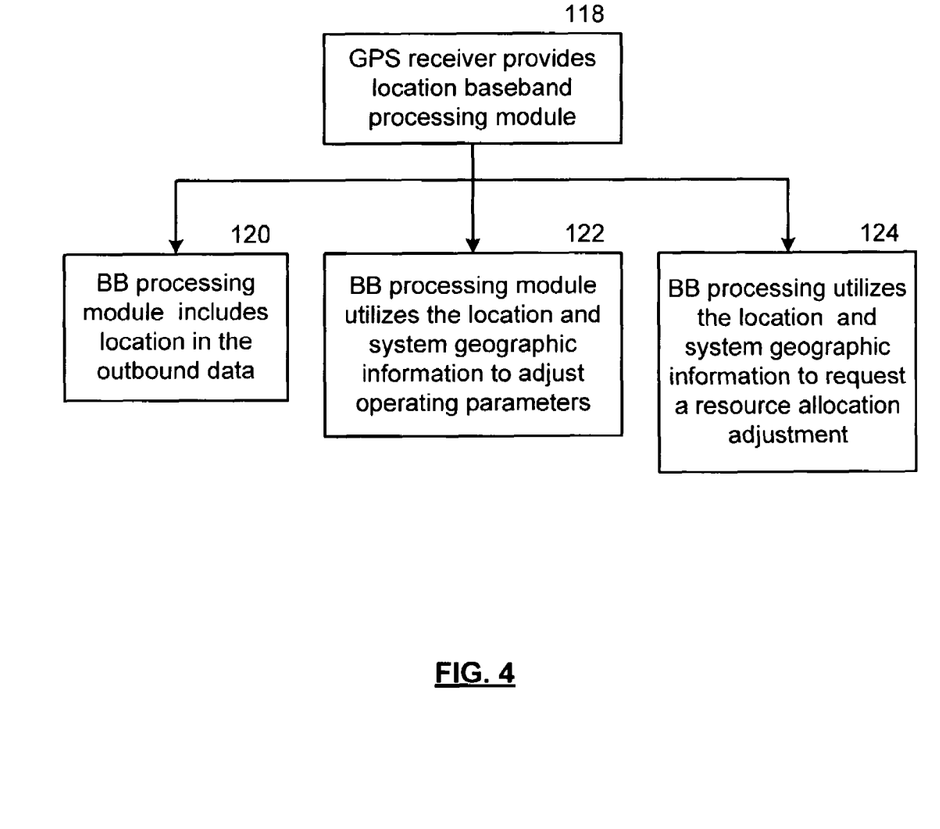

FIGS. 3 and 4 are logic diagrams of embodiments of a method for GPS functionality in the IC 52. The method of FIG. 3 begins at step 110 where the GPS receiver 60 determines a time delay for at least some of the plurality of C/A signals 94 in accordance with the at least one clock signal 102. The method then proceeds to step 112 where the GPS receiver calculates distance to a corresponding plurality of satellites of the at least some of the plurality of C/A signals based on the time delays for the at least some of the plurality of C/A signals. In other words, for each GPS RF signal received, which are received from different satellites, the GPS receiver is calculating a time delay with respect to each satellite that the communication device is receiving a GPS RF signal from, or a subset thereof. For instance, the GPS receiver 60 identifies each satellite's signal by its distinct C/A code pattern, then measures the time delay for each satellite. To do this, the receiver produces an identical C/A sequence using the same seed number as the satellite. By lining up the two sequences, the receiver can measure the delay and calculate the distance to the satellite, called the pseudorange. Note that overlapping pseudoranges may be represented as curves, which are modified to yield the probable position.

The method proceeds to step 114 where the GPS receiver 60 calculates the position of the corresponding plurality of satellites based on corresponding navigation messages of the plurality of navigation messages. For example, the GPS receiver 60 uses the orbital position data of the navigation message 96 to calculate the satellite's position. The method then proceeds to step 116 where the GPS receiver 60 determines the location of the IC 52 (which is also the position of the communication device 50) based on the distance of the corresponding plurality of satellites and the position of the corresponding plurality of satellites. For instance, by knowing the position and the distance of a satellite, the GPS receiver 60 can determine it's location to be somewhere on the surface of an imaginary sphere centered on that satellite and whose radius is the distance to it. When four satellites are measured simultaneously, the intersection of the four imaginary spheres reveals the location of the receiver. Often, these spheres will overlap slightly instead of meeting at one point, so the receiver will yield a mathematically most-probable position (and often indicate the uncertainty).

FIG. 4 is a logic diagram of a method for utilizing the position of the communication device that begins at step 118 where the GPS receiver 60 provides the location of the IC 52 to the baseband processing module 54. The method then proceeds to one of steps 120-124. At step 120, the baseband processing module 54 includes the location of the IC 52 in the outbound data 72. In this instance, the receiving device (e.g., a base station and/or an access point) may use the location of the communication device to adjust the services provided to the communication device, change the wireless resources allocated to the communication device, adjust beamforming coefficients, etc.

At step 122, the baseband processing module 54 utilizes the location of the IC 52 in conjunction with system geographic information (e.g., a map of the location of system resources such as base stations, access points, their channel frequencies, etc.) to adjust one of baseband beamforming coefficients, in-air beamforming coefficients, transmit power level, and data modulation protocol.

At step 124, the baseband processing module 54 utilizes the location of the IC 52 in conjunction with system geographic information to request a resource allocation adjustment. In this instance, the communication device 50 may request an adjustment of its allocated resources (e.g., channel assignment, affiliation with a base station or access point, etc.) based on its current location. In addition, the baseband processing module 54 may use a history of the communication device's location to determine a direction of travel to further assist in the request of resource allocation adjustments.

Figure 5:
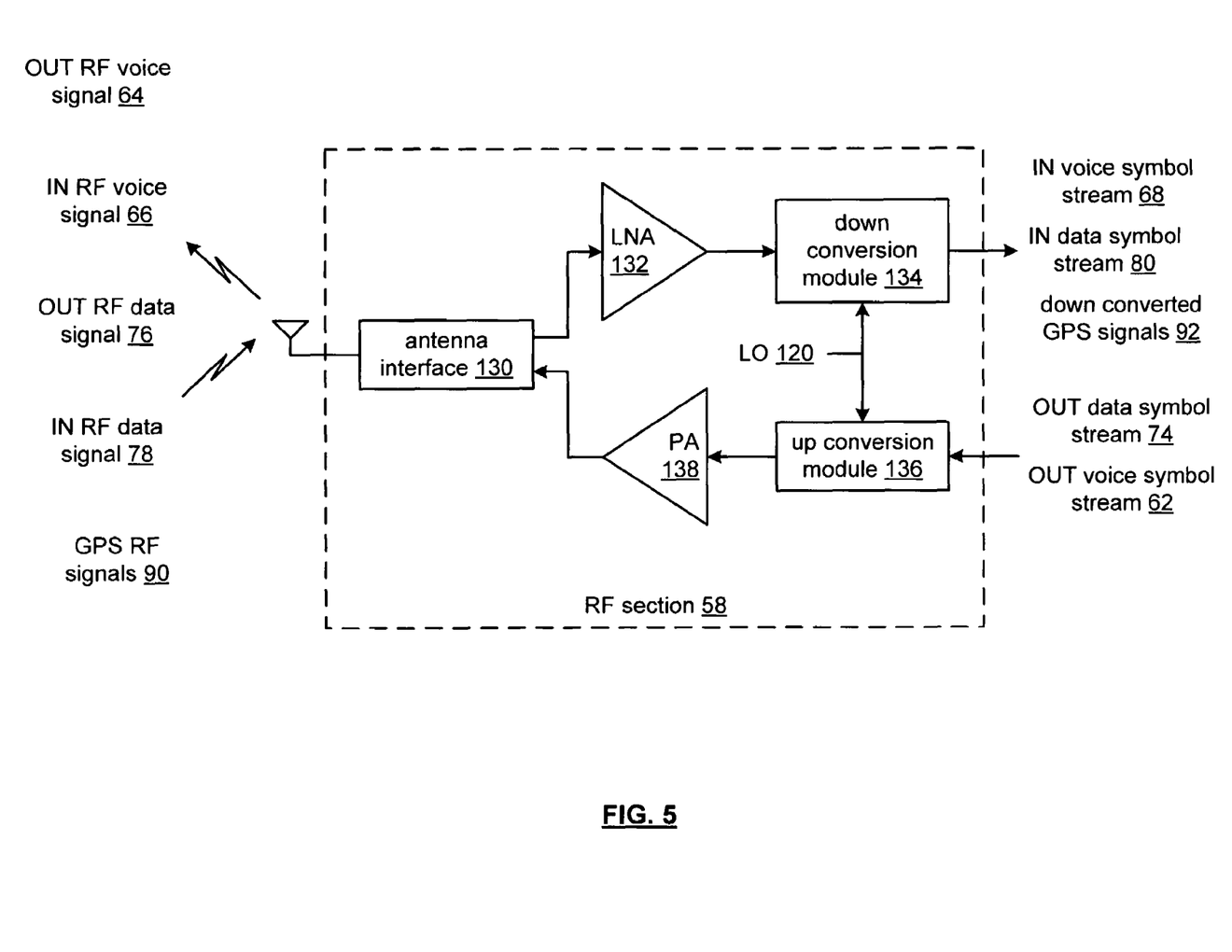
FIG. 5 is a schematic block diagram of an embodiment of RF section in accordance with the present invention.

FIG. 5 is a schematic block diagram of an embodiment of RF section 58 that includes an antenna interface 130, a low noise amplifier (LNA) module 132, a down conversion module 134, an up-conversion module 136, and a power amplifier (PA) module 138. In this embodiment, the antenna interface 130 is coupled to an antenna structure that includes one or more antennas arranged in a diversity pattern, in an orthogonal pattern, as an array, in a polarization pattern, and/or in a combination thereof to provide a wide bandwidth antenna structure (e.g., a bandwidth wide enough to receive GSM RF signals [900 MHz, 1800 MHz, 1900 MHz, etc.], CDMA RF signals [800 MHz, 900 MHz, 1900 MHz, 2100 MHz, etc.], EDGE RF signals and/or GPRS signals [900 MHz, 1800 MHz, 1900 MHz, etc.], and GPS satellite RF signals [1100 MHz, 1200 MHz, 1500 MHz, etc.]).

The antenna structure receives the inbound RF voice signal 64, the inbound RF data signal 76, and/or the GPS RF signals 90 and provides the received signal(s) to the antenna interface 130. The antenna interface 130, which may include a transformer balun, a transmit/receive switch, an impedance matching circuit, and/or a transmission line, couples the received RF signal to the LNA module 132.

The low noise amplifier module 132, which includes one ore more low noise amplifiers coupled in series, in parallel, or a combination thereof, is coupled to amplify the received RF signal (e.g., the inbound RF voice signal 66, the inbound RF data signal 78, and/or the GPS RF signals 90) to produce an amplified inbound RF signal. Note that the bandwidth, the gain, the frequency response, and/or the impedance of the LNA module 132 may be adjusted for the different types of RF signal received. For instance, the LNA module 132 may tuned (e.g., adjust the bandwidth, the gain, the frequency response, and/or the impedance) to correspond to the bandwidth of GSM signals (e.g., 900 MHz, 1800 MHz, 1900 MHz) when the received RF signal is an inbound RF voice signal is in accordance with the GSM standard. Alternatively, the LNA module 132 may have sufficient bandwidth to adequately receive the different types of RF signals.

The down conversion module 108, which may include one or more mixers, a bandpass filter or a low pass filter, is coupled to convert the amplified inbound RF signal into the inbound voice symbol stream 68, the inbound data symbol stream 80, or the plurality of down converted GPS signals 92 in accordance with a first local oscillation 120. For example, for a direct conversion down converter, the first local oscillation 120 corresponds to the carrier frequency of the received RF signal (e.g., 800 MHz, 900 MHz, 1100 MHz, 1200 MHz, 1500 MHz, 1800 MHz, 1900 MHz, 2100 MHz, etc.), which is mixed with the amplified inbound RF signal to produce a mixed signal (two mixed signals if the amplified inbound RF signal includes in-phase and quadrature components) that is filtered by the bandpass or low pass filter to produce the inbound voice symbol stream 68, the inbound data symbol stream 80, or the plurality of down converted GPS signals 92.

The up conversion module 136, which includes one or more mixers and a bandpass filter, is coupled to convert the outbound voice symbol stream 62 or the outbound data symbol stream 74 into an up-converted signal in accordance with the first local oscillation 120. In an embodiment, the first local oscillation 120 is generated by a phase locked loop that is modulated in accordance with the outbound voice or data symbol stream 62 or 74 and filtered to produce the up-converted voice or data signal. In another embodiment, an in-phase component of the first local oscillation 120 is mixed with an in-phase component of the outbound voice or data symbol stream 62 or 74 to produce a first mixed signal and a quadrature component of the first local oscillation 120 is mixed with a quadrature component of the outbound voice or data symbol stream 62 or 74 to produce a second mixed signal, where the first and second mixed signals are combined and filtered to produce the up-converted signal.

The power amplifier module 138, which includes one or more power amplifiers and/or one or more power amplifier drivers coupled in series and/or in parallel, is coupled to amplify the up-converted signal to produce the outbound RF voice signal 64 or the outbound RF data signal 76. The first PA module 114 provides the outbound RF voice or data signal 64 or 76 to the antenna interface 130 for transmission via the antenna structure. Note that the first PA module 138 may amplify the up-converted signal in accordance with amplitude modulation information when the outbound data or voice symbol stream 62 or 74 includes the amplitude modulation information.

In one mode of the operation, the baseband processing module 54 controls non-concurrent processing of the outbound voice signal 61, the inbound voice signal 70, the outbound data signal 72, the inbound data signal 82, and the plurality of down converted GPS signals 92. For example, the non-concurrent processing may have the communication device in a voice mode such that the baseband processing module 54 is processing the inbound and/or outbound voice signals 61 and 70 and not processing the other signals. As another example, the non-concurrent processing may have the communication device 50 in a data mode such that the baseband processing module 54 is processing the inbound and/or outbound data signals 72 and 82 and not processing the other signals. As a further example, the non-concurrent processing may have the communication device 50 in a GPS mode such that the GPS receiver 60 is processing the plurality of down converted GPS signals 92 and the baseband processing module 54 is not processing the other signals.

In another mode of operation, the baseband processing module 54 controls divisional multiple access (DMA) processing of the outbound voice signal, the inbound voice signal, the outbound data signal, the inbound data signal, and the plurality of down converted GPS signals such that the communication device 50 can seemingly be in the voice mode, data mode, and/or the GPS mode concurrently. For example, the RF signals 64, 66, 76, 78, and/or 90 may be processed in accordance with a time division multiple access (TDMA) scheme, a frequency division multiple access scheme (FDMA), and/or a code division multiple access (CDMA) scheme.

Figure 6:
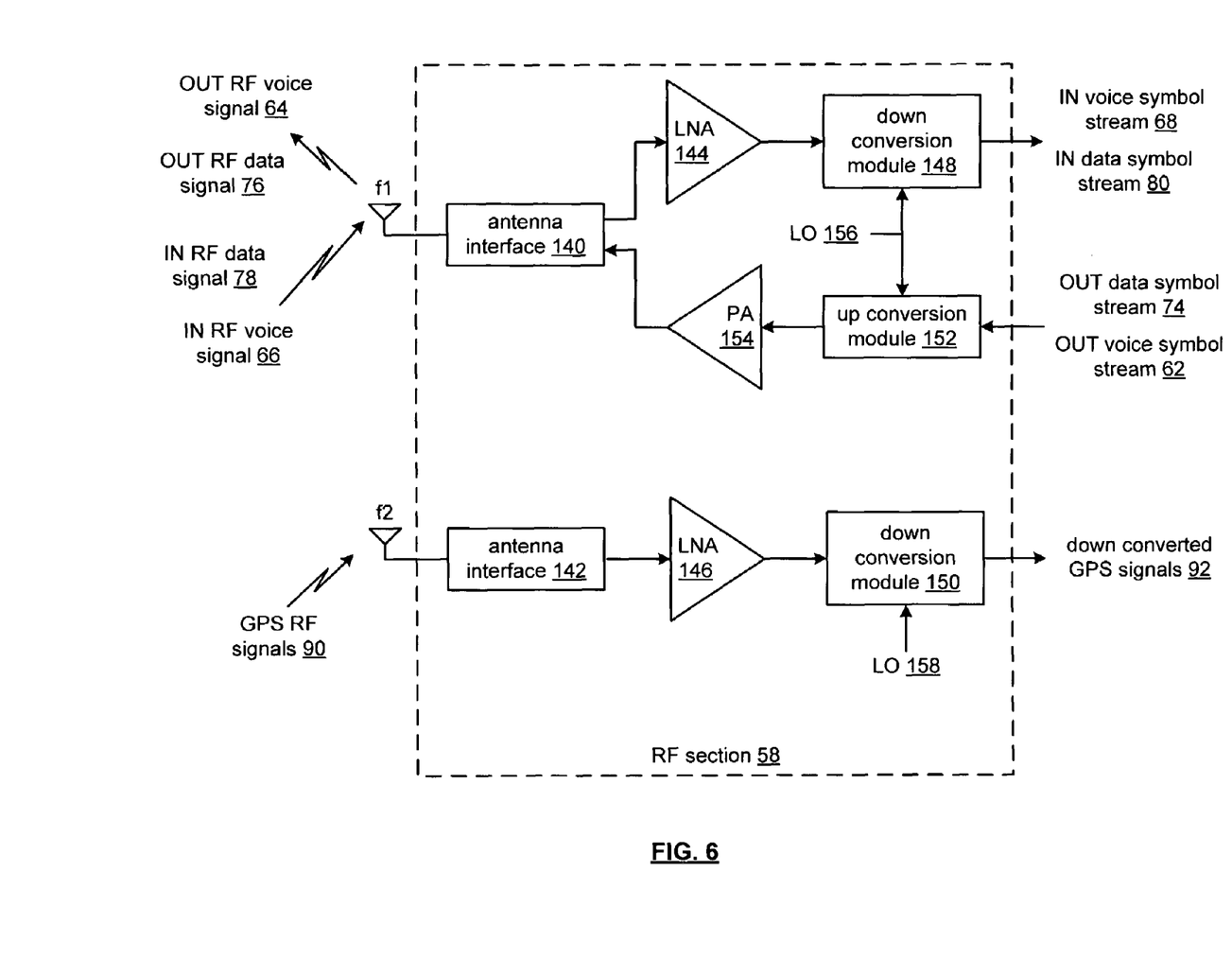
FIG. 6 is a schematic block diagram of another embodiment of RF section in accordance with the present invention.

FIG. 6 is a schematic block diagram of another embodiment of RF section 58 that includes first and second antenna interfaces 140 and 142, first and second low noise amplifier (LNA) modules 144 and 146, first and second down conversion modules 148 and 150, an up-conversion module 152, and a power amplifier (PA) module 154.

The first antenna interface 140, which may include a transformer balun, a transmit/receive switch, an impedance matching circuit, and/or a transmission line, is coupled to a first antenna structure that transceives the inbound and outbound RF voice signals 64 and 66 and/or the inbound and outbound RF data signals 76 and 78 in a first frequency band. The first antenna structure includes one or more antennas that are operable in the first frequency band and are arranged in a diversity pattern, in an orthogonal pattern, as an array, in a polarization pattern, and/or in a combination thereof.

The second antenna interface 142, which may include a transformer balun, a transmit/receive switch, an impedance matching circuit, and/or a transmission line, is coupled to a second antenna structure that receives the GPS RF signals 90 in a second frequency band. The second antenna structure includes one or more antennas that are operable in the second frequency band and are arranged in a diversity pattern, in an orthogonal pattern, as an array, in a polarization pattern, and/or in a combination thereof.

As an example of the first and second frequency bands, assume that the GPS RF signals 90 are within the 1100 MHz, 1200 MHz, or 1500 MHz frequency band. Further assume that the voice signals 64 and 66 are generated in accordance with frequency division duplex (FDD) WCDMA such that the first frequency band corresponds to a 1900 MHz and 2100 MHz frequency bands (e.g., 1920-1980 MHz for uplink communications and 2110-2170 MHz for downlink communications). As another example, assume that the voice signals 64 and 66 are generated in accordance with time division duplex (TDD) WCDMA such that the first frequency band corresponds to the 1900 and 2100 MHz frequency bands (e.g., 1900-1920 MHz and 2010-2025 MHz, which are shared by the uplink and downlink communications).

As a further example, assume that the voice signals 64 and 66 are generated in accordance with a GSM standard such that the second frequency band corresponds to a 900 MHz frequency band (e.g., 880-915 MHz and 925-960 MHz), an 1800 MHz frequency band (e.g., 1710-1785 MHz and 1805-1880 MHz), and/or a 1900 MHz frequency band (e.g., 1850-1910 MHz and 1930-1990 MHz). As yet a further example, assume that the data signals 76 and 78 are generated in accordance with an EDGE standard such that the second frequency band corresponds to the 900 MHz, 1800 MHz, and/or 1900 MHz frequency bands. As still another example, assume that the data signals 76 and 78 are generated in accordance with a GPRS standard such that the second frequency band corresponds to the 900 MHz, 1800 MHz, and/or 1900 MHz frequency bands.

The first low noise amplifier module 144, which includes one ore more low noise amplifiers coupled in series, in parallel, or a combination thereof, is coupled to amplify the inbound RF voice signal 64 or the inbound RF data signal 78 to produce an amplified inbound RF voice or data signal. The first down conversion module 148, which may include one or more mixers, a bandpass filter or a low pass filter, is coupled to convert the amplified inbound RF voice or data signal into the inbound voice or data symbol stream 68 or 80 in accordance with a first local oscillation 156. For example, for a direct conversion down converter, the first local oscillation 156 corresponds to the carrier frequency of the inbound RF voice or data signal 64 or 78, which is mixed with the amplified inbound RF voice or data signal to produce a mixed signal (two mixed signals if the amplified inbound RF voice or data signal includes in-phase and quadrature components) that is filtered by the bandpass or low pass filter to produce the inbound voice or data symbol stream 68 or 80.

The up conversion module 152, which includes one or more mixers and a bandpass filter, is coupled to convert the outbound voice symbol stream 62 or the outbound data symbol stream 74 into an up-converted voice or data signal in accordance with the first local oscillation 156. In an embodiment, the first local oscillation 156 is generated by a phase locked loop that is modulated in accordance with the outbound voice or data symbol stream 62 or 74 and filtered to produce the up-converted voice or data signal. In another embodiment, an in-phase component of the first local oscillation 156 is mixed with an in-phase component of the outbound voice or data symbol stream 62 or 74 to produce a first mixed signal and a quadrature component of the first local oscillation 156 is mixed with a quadrature component of the outbound voice or data symbol stream 62 or 74 to produce a second mixed signal, where the first and second mixed signals are combined and filtered to produce the up-converted voice or data signal.

The power amplifier module 154, which includes one or more power amplifiers and/or one or more power amplifier drivers coupled in series and/or in parallel, is coupled to amplify the up-converted voice or data signal to produce the outbound RF voice signal 64 or the outbound RF data signal 76. The first PA module 154 provides the outbound RF voice or data signal 64 or 76 to the first antenna interface 140 for transmission via the first antenna structure. Note that the first PA module 154 may amplify the up-converted data signal in accordance with amplitude modulation information when the outbound data symbol stream 74 includes the amplitude modulation information.

The second low noise amplifier module 146, which includes one ore more low noise amplifiers coupled in series, in parallel, or a combination thereof, is coupled to amplify the GPS RF signals 90 to produce amplified GPS RF signals. The second down conversion module 150, which may include one or more mixers, a bandpass filter or a low pass filter, is coupled to convert the amplified GPS RF signals into the plurality of down converted GPS signals 92 in accordance with a second local oscillation 158. For example, for a direct conversion down converter, the second local oscillation 158 corresponds to the carrier frequency of the GPS RF signals 90, which is mixed with the amplified GPS RF signals to produce a mixed signal (two mixed signals if the amplified GPS RF signals includes in-phase and quadrature components) that is filtered by the bandpass or low pass filter to produce the plurality of down converted GPS signals 92.

Figure 7:
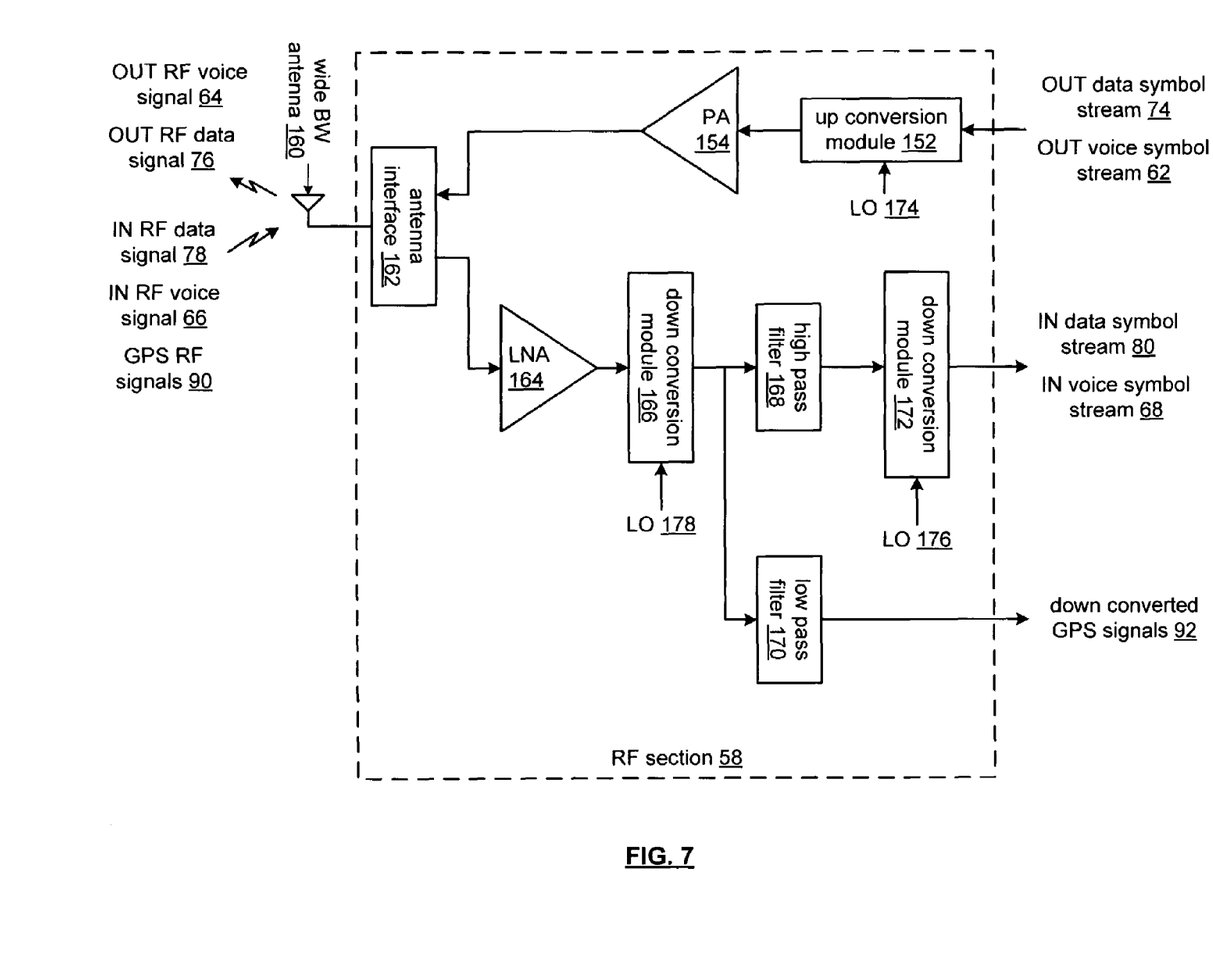
FIG. 7 is a schematic block diagram of another embodiment of RF section in accordance with the present invention.

FIG. 7 is a schematic block diagram of another embodiment of RF section 58 coupled to a wide bandwidth antenna 160. The RF section 58 includes an antenna interface 162, the PA module 154, the up-conversion module 152, a low noise amplifier (LNA) module 164, a first down conversion module 166, a high pass filter 168, a low pass filter 170, and a second down conversion module 172. In this embodiment, the PA module 154 and the up-conversion module 152 operate as previously discussed with reference to FIG. 6 to convert the outbound data and/or voice symbol streams 62 and/64 into the outbound RF voice and/or data signals 64 and/or 76.

The wide bandwidth antenna structure 160 includes one or more antennas arranged in a diversity pattern, in an orthogonal pattern, as an array, in a polarization pattern, and/or in a combination thereof to provide a wide bandwidth antenna structure (e.g., a bandwidth wide enough to receive GSM RF signals [900 MHz, 1800 MHz, 1900 MHz, etc.], CDMA RF signals [800 MHz, 900 MHz, 1900 MHz, 2100 MHz, etc.], EDGE RF signals and/or GPRS signals [900 MHz, 1800 MHz, 1900 MHz, etc.], and GPS satellite RF signals [1100 MHz, 1200 MHz, 1500 MHz, etc.]). The wide bandwidth antenna structure 160 receives the plurality of GPS RF signals 90, the inbound RF data signal 78, and/or the inbound RF voice signal 66 as a wide bandwidth RF signal and provides the wide bandwidth RF signal to the antenna interface 162.

The antenna interface 162, which may include a transformer balun, a transmit/receive switch, an impedance matching circuit, and/or a transmission line, provides the wide bandwidth RF signal to the LNA module 164. The LNA module 164, which includes one ore more low noise amplifiers coupled in series, in parallel, or a combination thereof, is to amplify the wide bandwidth RF signal to produce an amplified wide bandwidth RF signal.

The first down conversion module 166, which may include one or more mixers, a bandpass filter or a low pass filter, is coupled to down convert the wide bandwidth RF signal to produce a down converted wide bandwidth signal that includes a baseband signal component and an intermediate frequency signal component, where the intermediate frequency signal component has a carrier frequency that approximately equals a different between the carrier frequency of the GPS RF signals and the carrier frequency of the inbound RF data or voice signal. For example, if the carrier frequency of the GPS RF signals 90 is approximately 1200 MHz and the carrier frequency of the voice or data RF signals 66 or 78 is 1800 MHz, then the carrier frequency of the intermediate frequency is approximately 600 MHz. Further, in this example, the first local oscillation 178 has a frequency corresponding to the carrier frequency of the GPS RF signals (e.g., approximately 1200 MHz) for a direct down conversion converter.

The high pass filter module 168 is coupled to attenuate the baseband signal component and to pass, substantially unattenuated, the intermediate frequency signal component to produce a filtered intermediate frequency signal component. Continuing with the example of the preceding paragraph, the high pass filter module 168 may have a corner frequency of 60 MHz and be a second order filter. The low pass filter module 170 is coupled to attenuate the intermediate frequency signal component and to pass, substantially unattenuated, the baseband signal component. Continuing with this example, the low pass filter module 170 may have a corner frequency of 60 MHz and a –40 dB per decade attenuation rate.

The second down conversion module 172 is coupled to convert the filtered intermediate frequency signal component in a second baseband signal component, which may be the inbound voice symbol stream 68 or the inbound data symbol stream 180. Continuing with the example, the second local oscillation 176 will have a frequency of approximately 600 MHz for direct conversion. In this instance, both the GPS RF signals 90 and the inbound RF voice and/or data signals 66 and/or 78 can be simultaneously received and down converted to the down converted GPS signals 92 and the inbound data or voice symbol streams 68 and/or 80, respectively.

Figure 8:
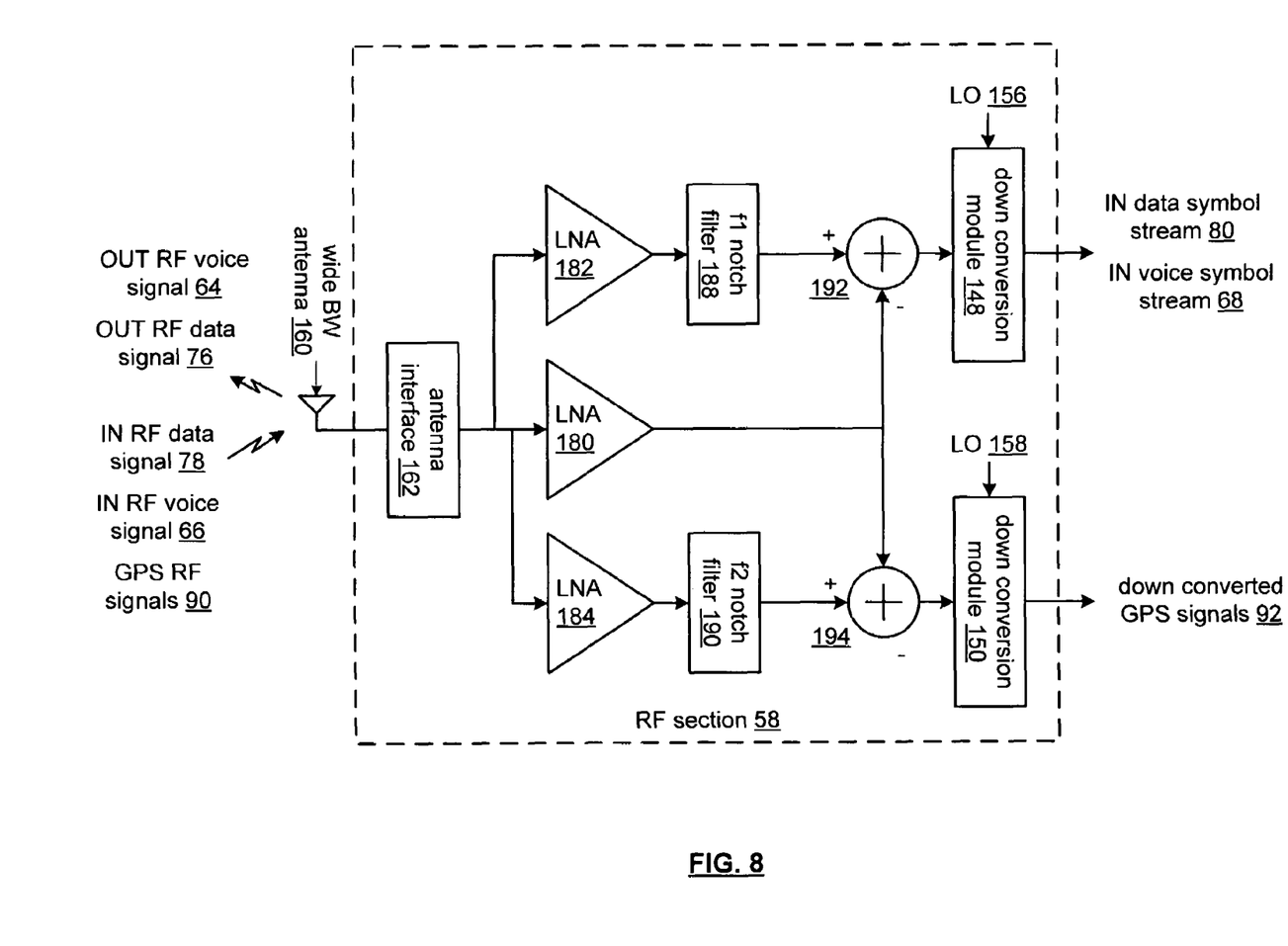
FIG. 8 is a schematic block diagram of another embodiment of RF section in accordance with the present invention.

FIG. 8 is a schematic block diagram of another embodiment of RF section 58 coupled to the wide bandwidth antenna structure 160. In this embodiment, the RF section 58 includes the antenna interface 162, a plurality of LNA modules 180-184, an f1 notch filter 188, an f2 notch filter 190, subtraction modules 192 and 194, and first and second down conversion modules 148 and 150.

The wide bandwidth antenna structure 160 receives the plurality of GPS RF signals 90, the inbound RF data signal 78, and/or the inbound RF voice signal 66 as a wide bandwidth RF signal and provides the wide bandwidth RF signal to the antenna interface 162. The antenna interface 162 provides the wide bandwidth RF signal to the plurality of LNA modules 180-184, each of which may include one or more low noise amplifiers coupled in series and/or in parallel.

The first low noise amplifier module 182 is coupled to amplify the wide bandwidth RF signal to produce a first amplified wide bandwidth RF signal. The second low noise amplifier module 184 coupled to amplify the wide bandwidth RF signal to produce a second amplified wide bandwidth RF signal. The third low noise amplifier module 180 is coupled to amplify the wide bandwidth RF signal to produce a third amplified wide bandwidth RF signal.

The f1 notch filter module 188 is coupled to notch filter the first amplified wide bandwidth RF signal to produce a first notch filtered RF signal. In an embodiment, the f1 notch filter module 188 has a center frequency corresponding to a carrier frequency of the plurality of GPS RF signals 90. The f2 notch filter module 190 is coupled to notch filter the second amplified wide bandwidth RF signal to produce a second notch filtered RF signal. In an embodiment, the f2 notch filter module 192 has a center frequency corresponding to a carrier frequency of the inbound RF voice or data signal 66 and/or 78.

The first subtraction module 192 is coupled to subtract the first notch filtered RF signal from the third amplified wide bandwidth RF signal to produce a notch filtered inbound RF voice or data signal. The second subtraction module 194 is coupled to subtract the second notch filtered RF signal from the third amplified wide bandwidth RF signal to produce a plurality of notch filtered GPS RF signals.

The first down conversion module 148 is coupled to convert the notch filtered inbound RF voice or data signal into the inbound voice symbol stream 68 or the inbound data symbol stream 80 in accordance with the first local oscillation 156. The second down conversion module 150 is coupled to convert the plurality of notch filtered GPS RF signals into the plurality of down converted GPS signals 92 in accordance with the second local oscillation 158.

Figure 9:
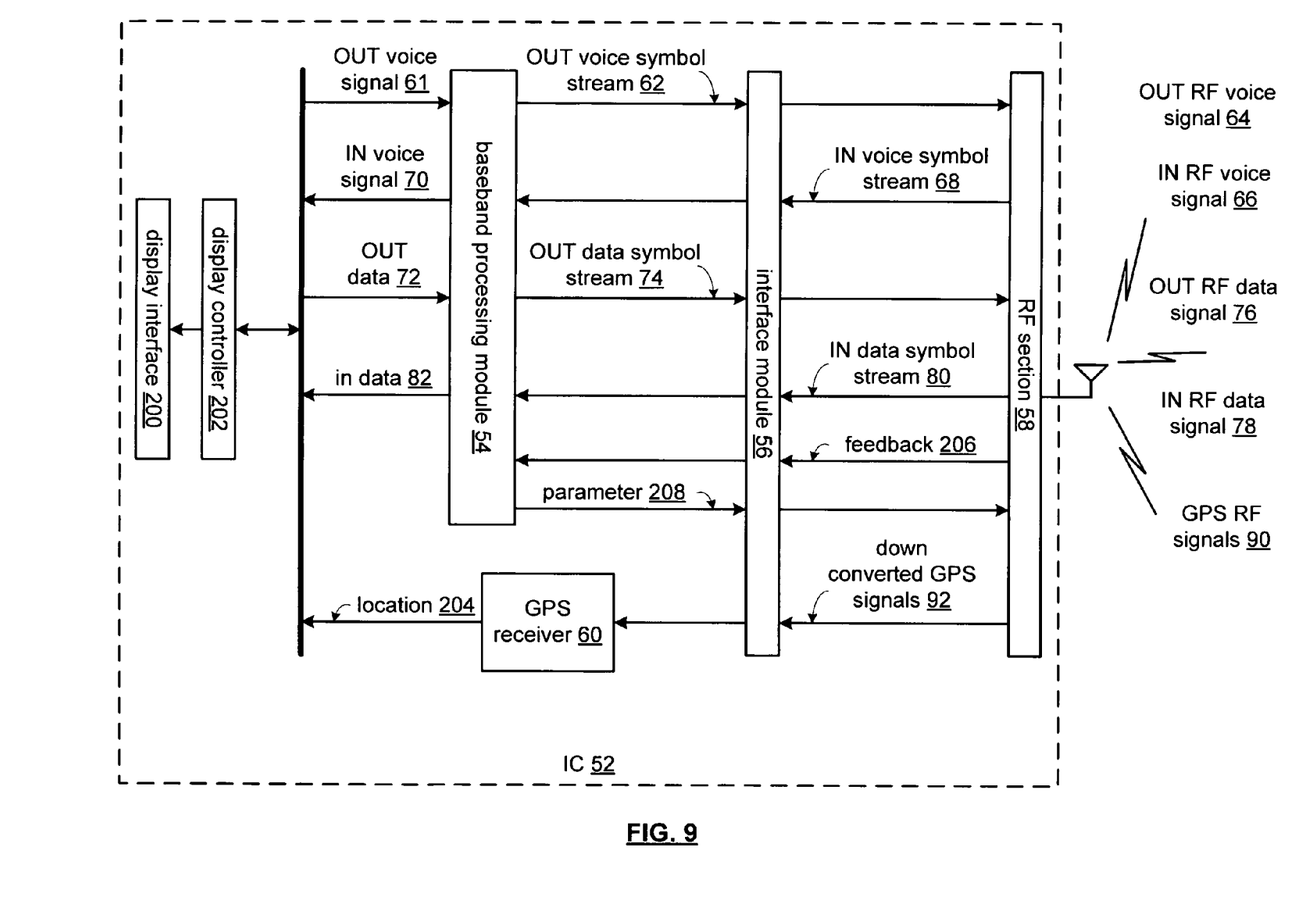
FIG. 9 is a schematic block diagram of an embodiment of an integrated circuit (IC) in accordance with the present invention.

FIG. 9 is a schematic block diagram of an embodiment of the IC 52 that includes the baseband processing module 54, the interface module 56, the RF section 58, the GPS receiver 60, a display controller 202, and a display interface 200. In this embodiment, the baseband processing module 54, the interface module 56, the RF section 58, and the GPS receiver 60 function as previously described and further function as described with reference to this figure.

In this embodiment, the display interface 200 is coupled to an off-chip display for displaying the inbound data 82, the outbound data 72, and/or the location 204 of the communication device 50 as indicated by the location of the IC 52. The display controller 202 controls displaying of at least one of the inbound data 82, the outbound data 72, and GPS graphics on the display, wherein the GPS receiver module 60 generates the GPS graphics corresponding to processing of the plurality of C/A signals and the plurality of navigation messages to determine the location 204 of the IC 52.

In this embodiment, the baseband processing module 54 may generate at least one parameter setting (e.g., transmit power level, frequency response, quality factor, impedance matching, local oscillation, etc. of the RF section 58) based on RF feedback. The RF section 58 generates the RF feedback to indicate a current level of the parameter settings, the type of RF signal being received, and/or any other transceiving metric to improve RF transmission or RF reception. The RF section 58 may adjusts it operation based on the at least one parameter setting to improve the level of RF transmission and/or the level or RF reception.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. An integrated circuit (IC) comprises:
    a baseband processing module coupled to:
        convert an outbound voice signal into an outbound voice symbol stream;
        convert an inbound voice symbol stream into an inbound voice signal;
        convert outbound data into an outbound data symbol stream; and
        convert an inbound data symbol stream into inbound data;
    a global positioning satellite (GPS) receiver module coupled to recover a plurality of coarse/acquisition (C/A) signals and a plurality of navigation messages from a plurality of down converted GPS signals;
    a radio frequency (RF) section coupled to:
        convert an inbound RF voice signal into the inbound voice symbol stream;
        convert the outbound voice symbol stream into an outbound RF voice signal;
        convert an inbound RF data signal into the inbound data symbol stream;
        convert the outbound data symbol stream into an outbound RF data signal;
        convert a plurality of GPS RF signals into the plurality of down converted GPS signals; and
    an interface module coupled to:
        convey the inbound voice symbol stream and the outbound voice symbol stream between the baseband processing module and the RF section;
        convey the inbound data symbol stream and the outbound data symbol stream between the baseband processing module and the RF section; and
        convey the plurality of down converted GPS signals from the RF section to the GPS receiver module.

2. The IC of claim 1 further comprises:
    a clock module coupled to generate at least one clock signal, wherein the clock module updates the at least one clock signal in accordance with at least one of the plurality of C/A signals.

3. The IC of claim 2, wherein the GPS receiver module further functions to:
    determine time delay for at least some of the plurality of C/A signals in accordance with the at least one clock signal;
    calculate distance to a corresponding plurality of satellites of the at least some of the plurality of C/A signals based on the time delays for the at least some of the plurality of C/A signals;
    calculate position of the corresponding plurality of satellites based on corresponding navigation messages of the plurality of navigation messages; and
    determine location of the IC based on the distance of the corresponding plurality of satellites and the position of the corresponding plurality of satellites.

4. The IC of claim 3 further comprises:
    the GPS receiver providing the location of the IC to the baseband processing module; and the baseband processing module further functions to perform at least one of:
including the location of the IC in the outbound data;
utilizing the location of the IC in conjunction with system geographic information to adjust one of baseband beamforming coefficients, in-air beamforming coefficients, transmit power level, and data modulation protocol; and
utilizing the location of the IC in conjunction with system geographic information to request a resource allocation adjustment.

5. The IC of claim 1, wherein the RF section comprises:
an antenna interface coupled to at least one antenna, wherein the at least one antenna transceives the inbound and outbound RF voice signals, transceives the inbound and outbound RF data signals, and receives the GPS RF signals;
a low noise amplifier module coupled to amplify the inbound RF voice signal, the inbound RF data signal, or the GPS RF signals to produce an amplified RF signal;
a down conversion module coupled to convert the amplified RF signal into the inbound voice symbol stream, the inbound data symbol stream, or the plurality of down converted GPS signals;
an up conversion module coupled to convert the outbound voice symbol stream or the outbound data symbol stream into an up converted signal; and
a power amplifier module coupled to amplify the up converted signal to produce the outbound RF voice signal or the outbound RF data signal.

6. The IC of claim 5 further comprises:
the baseband processing module further functions to control non-concurrent processing of the outbound voice signal, the inbound voice signal, the outbound data signal, the inbound data signal, and the plurality of down converted GPS signals.

7. The IC of claim 5 further comprises:
the baseband processing module further functions to control divisional multiple access (DMA) processing of the outbound voice signal, the inbound voice signal, the outbound data signal, the inbound data signal, and the plurality of down converted GPS signals.

8. The IC of claim 1, wherein the RF section comprises:
a first antenna interface coupled to a first antenna structure, wherein the first antenna structure transceives the inbound and outbound RF voice signals and transceives the inbound and outbound RF data signals;
a second antenna interface coupled to a second antenna structure, wherein the second antenna structure receives the GPS RF signals;
a first low noise amplifier module coupled to amplify the inbound RF voice signal or the inbound RF data signal to produce am amplified RF signal;
a second low noise amplifier module coupled to amplify the GPS RF signals to produce amplified GPS RF signals;
a first down conversion module coupled to convert the amplified RF signal into the inbound voice symbol stream or the inbound data symbol stream;
a second down conversion module coupled to convert the amplified GPS RF signals into the plurality of down converted GPS signals;
an up conversion module coupled to convert the outbound voice symbol stream or the outbound data symbol stream into an up converted signal; and
a power amplifier module coupled to amplify the up converted signal to produce the outbound RF voice signal or the outbound RF data signal.

9. The IC of claim 1, wherein the RF section comprises:
an antenna interface coupled to a wide bandwidth antenna structure, wherein the wide bandwidth antenna structure receives, as a wide bandwidth RF signal, the plurality of GPS RF signals and the inbound RF data signal or the inbound RF voice signal;
a low noise amplifier module coupled to amplify the wide bandwidth RF signal to produce an amplified wide bandwidth RF signal;
a first down conversion module coupled to down convert the wide bandwidth RF signal to produce a down converted wide bandwidth signal that includes a baseband signal component and an intermediate frequency signal component, wherein the intermediate frequency signal component has a carrier frequency that approximately equals a different between frequency of a carrier frequency of the GPS RF signals and frequency of a carrier frequency of the inbound RF data or voice signal;
a high pass filter module coupled to attenuate the baseband signal component and to pass, substantially unattenuated, the intermediate frequency signal component to produce a filtered intermediate frequency signal component;
a low pass filter module coupled to attenuate the intermediate frequency signal component and to pass, substantially unattenuated, the baseband signal component; and
a second down conversion module coupled to convert the filtered intermediate frequency signal component in a second baseband signal component.

10. The IC of claim 1, wherein the RF section comprises:
an antenna interface coupled to a wide bandwidth antenna structure, wherein the wide bandwidth antenna structure receives, as a wide bandwidth RF signal, the plurality of GPS RF signals and the inbound RF data signal or the inbound RF voice signal;
a first low noise amplifier module coupled to amplify the wide bandwidth RF signal to produce a first amplified wide bandwidth RF signal;
a second low noise amplifier module coupled to amplify the wide bandwidth RF signal to produce a second amplified wide bandwidth RF signal;
a third low noise amplifier module coupled to amplify the wide bandwidth RF signal to produce a third amplified wide bandwidth RF signal;
a first notch filter module coupled to notch filter the first amplified wide bandwidth RF signal to produce a first notch filtered RF signal, wherein the first notch filter module has a center frequency corresponding to a carrier frequency of the plurality of GPS RF signals;
a second notch filter module coupled to notch filter the second amplified wide bandwidth RF signal to produce a second notch filtered RF signal, wherein the second notch filter module has a center frequency corresponding to a carrier frequency of the inbound RF voice or data signal;
a first subtraction module coupled to subtract the first notch filtered RF signal from the third amplified wide bandwidth RF signal to produce a notch filtered inbound RF voice or data signal;
a second subtraction module coupled to subtract the second notch filtered RF signal from the third amplified wide bandwidth RF signal to produce a plurality of notch filtered GPS RF signals;

a first down conversion module coupled to convert the notch filtered inbound RF voice or data signal into the inbound voice symbol stream or the inbound data symbol stream; and a second down conversion module coupled to convert the plurality of notch filtered GPS RF signals into the plurality of down converted GPS signals.

11. The IC of claim 1 further comprises:

a display interface coupled to a display; and a display controller coupled to the GPS receiver module, the baseband processing module, and the display interface, wherein the display controller controls displaying of at least one of the inbound data, the outbound data, and GPS graphics on the display, wherein the GPS receiver module generates the GPS graphics corresponding to processing of the plurality of C/A signals and the plurality of navigation messages.

12. The IC of claim 1 further comprises:

the baseband processing module generating at least one parameter setting based on RF feedback;

the RF section generating the RF feedback; and the RF section adjusting operation based on the at least one parameter setting.

13. An integrated circuit (IC) comprises:

a voice baseband processing module coupled to:
 convert an outbound voice signal into an outbound voice symbol stream;
 convert an inbound voice symbol stream into an inbound voice signal;

a data baseband processing module coupled to:
 convert outbound data into an outbound data symbol stream; and
 convert an inbound data symbol stream into inbound data;

a global positioning satellite (GPS) receiver module coupled to recover a plurality of coarse/acquisition (C/A) signals and a plurality of navigation messages from a plurality of down converted GPS signals;

a configurable radio frequency (RF) section, wherein, when the configurable RF section is a voice mode, the configurable RF section is coupled to:
 convert an inbound RF voice signal into the inbound voice symbol stream; and
 convert the outbound voice symbol stream into an outbound RF voice signal;

wherein, when the configurable RF section is a data mode, the configurable RF section is coupled to:
 convert an inbound RF data signal into the inbound data symbol stream; and
 convert the outbound data symbol stream into an outbound RF data signal;

wherein, when the configurable RF section is a GPS mode, the configurable RF section is coupled to convert a plurality of GPS RF signals into the plurality of down converted GPS signals.

14. The IC of claim 13 further comprises:

a clock module coupled to generate at least one clock signal, wherein the clock module updates the at least one clock signal in accordance with at least one of the plurality of C/A signals.

15. The IC of claim 14, wherein the GPS receiver module further functions to:

determine time delay for at least some of the plurality of C/A signals in accordance with the at least one clock signal;

calculate distance to a corresponding plurality of satellites of the at least some of the plurality of C/A signals based on the time delays for the at least some of the plurality of C/A signals;

calculate position of the corresponding plurality of satellites based on corresponding navigation messages of the plurality of navigation messages; and determine location of the IC based on the distance of the corresponding plurality of satellites and the position of the corresponding plurality of satellites.

16. The IC of claim 15 further comprises:

the GPS receiver providing the location of the IC to the data or voice baseband processing module; and the data or voice baseband processing module further functions to perform at least one of:
 including the location of the IC in the outbound data;
 utilizing the location of the IC in conjunction with system geographic information to adjust one of baseband beamforming coefficients, in-air beamforming coefficients, transmit power level, and data modulation protocol; and
 utilizing the location of the IC in conjunction with system geographic information to request a resource allocation adjustment.

17. The IC of claim 13, wherein the configurable RF section comprises:

an antenna interface coupled to at least one antenna, wherein the at least one antenna transceives the inbound and outbound RF voice signals, transceives the inbound and outbound RF data signals, and receives the GPS RF signals;

a low noise amplifier module coupled to amplify the inbound RF voice signal, the inbound RF data signal, or the GPS RF signals to produce an amplified RF signal;

a down conversion module coupled to convert the amplified RF signal into the inbound voice symbol stream, the inbound data symbol stream, or the plurality of down converted GPS signals;

an up conversion module coupled to convert the outbound voice symbol stream or the outbound data symbol stream into an up converted signal; and a power amplifier module coupled to amplify the up converted signal to produce the outbound RF voice signal or the outbound RF data signal.

18. The IC of claim 13, wherein the configurable RF section comprises:

an antenna interface coupled to a wide bandwidth antenna structure, wherein the wide bandwidth antenna structure receives, as a wide bandwidth RF signal, the plurality of GPS RF signals and the inbound RF data signal or the inbound RF voice signal;

a low noise amplifier module coupled to amplify the wide bandwidth RF signal to produce an amplified wide bandwidth RF signal;

a first down conversion module coupled to down convert the wide bandwidth RF signal to produce a down converted wide bandwidth signal that includes a baseband signal component and an intermediate frequency signal component, wherein the intermediate frequency signal component has a carrier frequency that approximately equals a different between frequency of a carrier frequency of the GPS RF signals and frequency of a carrier frequency of the inbound RF data or voice signal;

a high pass filter module coupled to attenuate the baseband signal component and to pass, substantially unattenuated, the intermediate frequency signal component to produce a filtered intermediate frequency signal component;

a low pass filter module coupled to attenuate the intermediate frequency signal component and to pass, substantially unattenuated, the baseband signal component; and a second down conversion module coupled to convert the filtered intermediate frequency signal component in a second baseband signal component.

19. The IC of claim 13, wherein the configurable RF section comprises:

an antenna interface coupled to a wide bandwidth antenna structure, wherein the wide bandwidth antenna structure receives, as a wide bandwidth RF signal, the plurality of GPS RF signals and the inbound RF data signal or the inbound RF voice signal;

a first low noise amplifier module coupled to amplify the wide bandwidth RF signal to produce a first amplified wide bandwidth RF signal;

a second low noise amplifier module coupled to amplify the wide bandwidth RF signal to produce a second amplified wide bandwidth RF signal;

a third low noise amplifier module coupled to amplify the wide bandwidth RF signal to produce a third amplified wide bandwidth RF signal;

a first notch filter module coupled to notch filter the first amplified wide bandwidth RF signal to produce a first notch filtered RF signal, wherein the first notch filter module has a center frequency corresponding to a carrier frequency of the plurality of GPS RF signals;

a second notch filter module coupled to notch filter the second amplified wide bandwidth RF signal to produce a second notch filtered RF signal, wherein the second notch filter module has a center frequency corresponding to a carrier frequency of the inbound RF voice or data signal;

a first subtraction module coupled to subtract the first notch filtered RF signal from the third amplified wide bandwidth RF signal to produce a notch filtered inbound RF voice or data signal;

a second subtraction module coupled to subtract the second notch filtered RF signal from the third amplified wide bandwidth RF signal to produce a plurality of notch filtered GPS RF signals;

a first down conversion module coupled to convert the notch filtered inbound RF voice or data signal into the inbound voice symbol stream or the inbound data symbol stream; and a second down conversion module coupled to convert the plurality of notch filtered GPS RF signals into the plurality of down converted GPS signals.

20. The IC of claim 13 further comprises:

a display interface coupled to a display; and a display controller coupled to the GPS receiver module, the baseband processing module, and the display interface, wherein the display controller controls displaying of at least one of the inbound data, the outbound data, and GPS graphics on the display, wherein the GPS receiver module generates the GPS graphics corresponding to processing of the plurality of C/A signals and the plurality of navigation messages.

* * * * *